United States Patent
Buentello et al.

(10) Patent No.: US 11,076,274 B1
(45) Date of Patent: Jul. 27, 2021

(54) MONITORING OF DATA TO PREDICT DRIVING EVENTS

(71) Applicant: United Services Automobile Association (USAA), San Antonio, TX (US)

(72) Inventors: Andre Rene Buentello, San Antonio, TX (US); Mark Anthony Lopez, Helotes, TX (US); Gregory Brian Meyer, San Antonio, TX (US); Ashley Raine Philbrick, San Antonio, TX (US); Garrett Rielly Rapport, San Antonio, TX (US); Jose L. Romero, Jr., San Antonio, TX (US); Michael Jay Szentes, San Antonio, TX (US)

(73) Assignee: United Services Automobile Association (USAA), San Antonio ( * ) Notice: Subject to any disclaimer, the term of this patent is extended or adjusted under 35 U.S.C. 154(b) by 0 days.

(21) Appl. No.: 16/579,326

(22) Filed: Sep. 23, 2019

Related U.S. Application Data

(60) Provisional application No. 62/797,755, filed on Jan. 28, 2019.

(51) Int. Cl.
| | |
|---|---|
| H04W 4/48 | (2018.01) |
| G08G 1/01 | (2006.01) |
| G07C 5/08 | (2006.01) |
| H04W 4/12 | (2009.01) |
| H04W 4/21 | (2018.01) |
| H04W 4/44 | (2018.01) |

(52) U.S. Cl.
CPC ............ *H04W 4/48* (2018.02); *G07C 5/0833* (2013.01); *G08G 1/0112* (2013.01); *H04W 4/12* (2013.01); *H04W 4/21* (2018.02); *G07C 5/08* (2013.01); *H04W 4/44* (2018.02)

(58) Field of Classification Search
CPC ........... H04W 4/48; H04W 4/21; H04W 4/12; H04W 4/44; G08G 1/0112; G07C 5/08; G07C 5/0833
USPC ...................................................... 340/539.11
See application file for complete search history.

(56) References Cited

U.S. PATENT DOCUMENTS

| | | | | | |
|---|---|---|---|---|---|
| 5,983,189 | A | * | 11/1999 | Lee ........................ | G08B 21/06 704/275 |
| 6,748,301 | B1 | * | 6/2004 | Ryu ..................... | B60K 28/063 340/426.11 |

(Continued)

*Primary Examiner* — John A Tweel, Jr.
(74) *Attorney, Agent, or Firm* — Fletcher Yoder P.C.

(57) ABSTRACT

The present disclosure relates to monitoring sound in and around a vehicle to predict unsafe driving events, and using the sound information to detect and reduce unsafe driving conditions. A computing device receives information indicative of a sound in or near a vehicle. The sound information may be received via the vehicle itself or via a device. The computing device then determines whether there is an indication of an unwanted driving event. The computing device also receives vehicle operation data extracted from one or more vehicle sensors. The computing device then determines whether there is an indication of unsafe driving conditions, and if there is, the computing device may output a notice or alert via a notification system to alert the driver or, in certain embodiments, other parties via social media, text message, chat programs, and the like.

9 Claims, 4 Drawing Sheets

(56) References Cited

U.S. PATENT DOCUMENTS

| | | | |
|---|---|---|---|
| 8,255,275 B2* | 8/2012 | Collopy | G06Q 30/0224 |
| | | | 705/14.49 |
| 9,296,299 B2* | 3/2016 | Ricci | G06N 5/02 |
| 9,615,213 B2* | 4/2017 | Tibbitts | B60T 8/172 |
| 9,899,039 B2* | 2/2018 | Bae | A61B 5/4803 |
| 10,102,732 B2* | 10/2018 | Gersten | H04W 4/02 |
| 10,121,075 B2* | 11/2018 | Du | G06F 3/012 |
| 2006/0253282 A1* | 11/2006 | Schmidt | G07C 5/0808 |
| | | | 704/233 |
| 2013/0145279 A1* | 6/2013 | Ricci | G06F 3/0481 |
| | | | 715/746 |

\* cited by examiner

MONITORING OF DATA TO PREDICT DRIVING EVENTS

CROSS REFERENCE TO RELATED APPLICATIONS

This application claims priority from and the benefit of U.S. Provisional Application Ser. No. 62/797,755, entitled "MONITORING OF DATA TO PREDICT DRIVING EVENTS," filed Jan. 28, 2019, which is hereby incorporated by reference in its entirety for all purposes.

BACKGROUND

The present disclosure relates generally to driving systems, and more particularly to systems and methods for using sound information to detect unsafe driving conditions.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A variety of factors may cause unsafe driving events, such as external vehicle conditions including poor weather conditions, road work, etc. or internal vehicle conditions including physical and verbal altercations, extremely loud music, etc. It is now recognized that systems and methods for detecting such factors and mitigating effects on driving are desirable.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that certain detectable characteristics may be associated with dangerous driving conditions, such as correlating sound with a manner in which a driver is operating a vehicle.

The present disclosure relates generally to monitoring sound in and around a vehicle to predict unsafe driving events, and more particularly to systems and methods for using the sound information to detect and reduce unsafe driving conditions. In some embodiments, a computing device may receive information indicative of a sound in or near a vehicle. The sound information may be received via the vehicle itself or via a device. The computing device then determines whether there is an indication of an unwanted driving event (e.g., a likelihood of an occurrence of abuse, a crime, a distracting environment, a fire, a flood, icy conditions, construction, pot holes, traffic conditions, or a combination thereof). The computing device also receives vehicle operation data extracted from one or more vehicle operation sensors. The vehicle operation sensor/sensors may include but are not limited to a motion sensor, an accelerometer, a gyroscope, an engine sensor, a battery sensor, an alternator sensor, a wheel sensor, a camera, or any combination thereof. The computing device then determines whether there is an indication of unsafe driving conditions, and if there is, the computing device may output a notice or alert via a notification system to alert the driver or, in certain embodiments, other parties via social media, text message, chat programs, and the like.

In this manner, the disclosed systems and methods may reduce impaired or unsafe driving. In additional or alternative embodiments, the electronic device may send an indication to nearby drivers within a threshold distance from the user that the user is determined to be impaired. This may alert the nearby drivers to the impaired driver, reducing traffic incidents.

Figure 1:
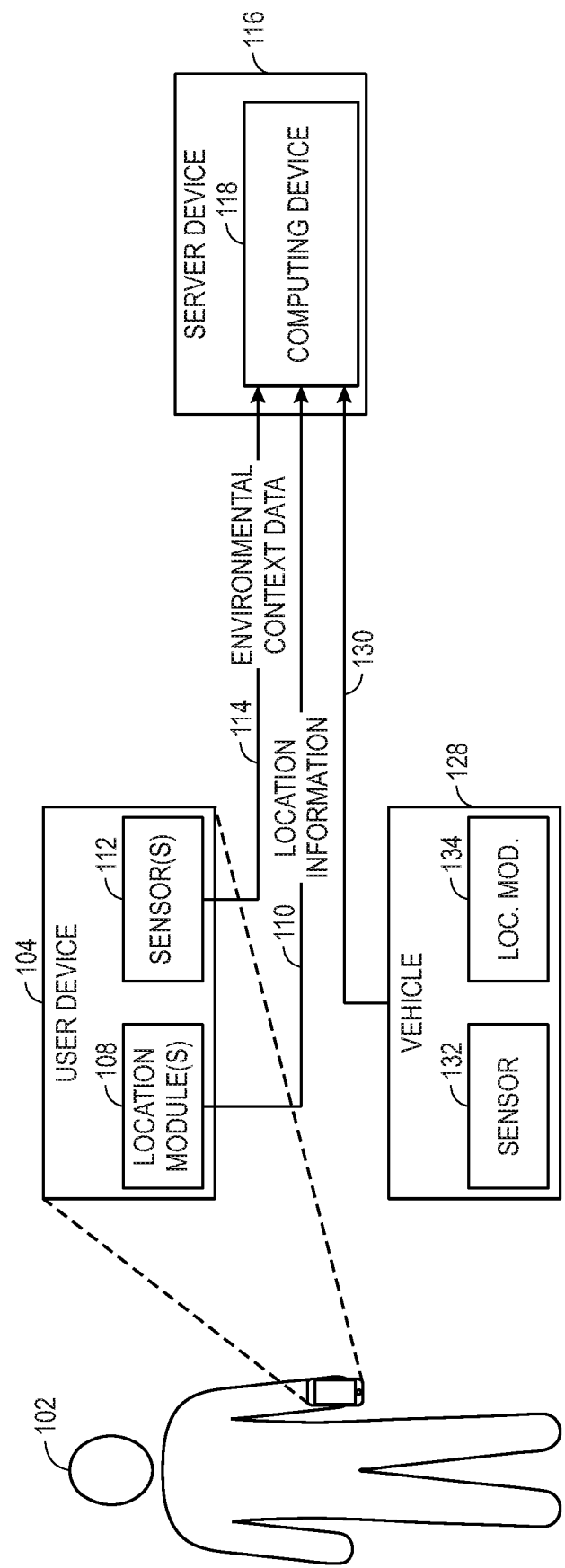
FIG. 1 illustrates a block diagram of a driving condition identification system, according to implementations of the present disclosure.

FIG. 1 depicts an example system for driving condition identification system, according to implementations of the present disclosure. As shown in the example of FIG. 1, an individual 102 may own, operate, or otherwise be associated with a user device 104. The user device 104 may include any suitable type of computing device. In some instances, the user device 104 is a portable computing device such as a smartphone, tablet computer, wearable device, implanted computer, automotive computer, portable gaming platform, and so forth, the location of which may change throughout the course of a day or other period of time as the individual 102 moves about. In some embodiments, the user device 104 may also be a less portable type of computing device, such as a desktop computer, laptop computer, game console, smart appliance, and so forth.

In general, the user device 104 captures a variety of data (e.g., sound data, etc.) associated with the user via one or more sensors 112 or user input devices. The sensors 112 may include any number or type of sensors, including sound detection sensors, proximity sensors, accelerometers, gyroscopes, biometric sensors, and/or temperature sensors.

Implementations employ environmental context data 114 to verify the location of the user or the user device 104 independently of the location information 110. In some implementations, the user device 104 includes one or more sensors 112 that generate environmental context data 114 that describes a current environmental context in proximity to the user device 104 at one or more times. The environmental context data 114 may include, but is not limited to, one or more of the following factors: sound data, temperature data, and/or weather data.

Implementations may also employ any other suitable type of sensor(s) for generating other appropriate types of environmental context data 114 and/or location information 110. In addition to the sensor(s) of the user device 104, implementations described herein include one or more sensors or devices that are associated with a vehicle and that are configured to provide environmental context data 114 and/or location information 110. For example, vehicle operation data 130 may be generated by a vehicle 128.

In some instances, one or more vehicle sensors 132 may be external to the vehicle 128. The environmental context data 114 generated by such external sensor(s) may be communicated to the server device(s) 116 using the user device 104 as an intermediary, or communicated (e.g., directly) without using the user device 104 as an intermediary. In instances where the environmental context data 114 is generated by external sensor(s), the communicated data may include other information that enables the computing device 118 to independently verify that the user device 104 was in proximity to the external sensor(s) when the environmental context data 114 was generated, such that the environmental context data 114 describes the (e.g., current) environment in proximity to the user device 104.

The sensors 112 and/or the vehicle sensors 132 may capture data that is used in the present techniques. Such data may include sound data. Sound data may include a current level of sound detected at the user device 104 or sound in or around the vehicle 128. Sound may be described using any suitable unit of measure, such as decibels. Sound data may also include a description of one or more frequencies of sound detected at the user device 104. Sound data may also include a description of patterns of sound detected at the user device 104, such as voices, music, noises caused by automobiles, airplanes, animals, and/or other identifiable sounds. Accordingly, the sensors 112 and/or 132 may include sensors configured to capture sound data, such as audio input sensor(s) such as microphone(s).

Temperature data may be generated by one or more temperature sensor(s), describing the current temperature of the environment at or near the user device 104 or the vehicle 128 using any suitable temperature scale. The water may also be water falling as precipitation near or onto the user device 104, such as rain, snow, sleet, and so forth. The water may also be suspended in the air as fog, clouds, and so forth.

Other weather data, such as description of the wind speed, wind direction, precipitation (e.g., rain, sleet, snow, hail, lightning, thunder, storms, tornados, hurricanes, typhoons, etc.) in proximity to the user device 104 and the vehicle 128. Weather data may be generated by sensor(s) configured to detect and/or analyze local weather conditions, e.g., by measuring wind speed and direction, precipitation, and so forth. Weather data for a general area around the vehicle 128 may also be obtained from a service communicating with the user device 104.

The user device 104 and/or the vehicle 128 may execute one or more location modules 108, 134 that determine a location of the user device 104. The location of the user device 104 may be determined using any suitable technique(s), to any appropriate degree of specificity. For example, the user device 104 may include location sensor(s), transceiver(s), and/or other software or hardware component(s) that are configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based navigation system may include one or more of a Global Positioning System (GPS) receiver, a Globalnaya Navigatsionnaya Sputnikovaya Sistema (GLONASS) receiver, a Galileo receiver, an Indian Regional Navigational Satellite (IRNS) System receiver, and so forth. The location may also be determined through geolocation based on an internet protocol (IP) address of the user device 104. In some cases, the location of the user device 104 and/or the individual 102 may be determined based on previously collected information describing the user device 104 and/or the individual 102, such as a previously specified address of the individual's home, workplace, social network posts, or other information indicating the individual's presence at a location such as a restaurant, store, or other location, and so forth.

The location determined by the location module(s) 108 may be communicated as location information 110 to one or more computing devices 118 executed on one or more server devices 116. The server device(s) 116 may include any suitable number and type of computing devices.

The environmental context data 114 may be communicated from the user device 104 to the server device(s) 116 over one or more networks. The computing device 118 may receive the environmental context data 114 and the location information data 110 to vehicle operation data 130 of the vehicle 128 to determine whether an unsafe driving condition is occurring. Further, the environmental context data 114 may be used to validate that vehicle damage is attributable to environmental conditions rather than operator error. In one example, a user-generated vehicle damage report claiming hail damage may be verified by accessing the environmental context data 114 of the vehicle (and/or other nearby vehicles) to confirm that the detected noise data in the damage time frame is indicative of hail damage.

The vehicle operation data 130 that is collected may include data extracted from the vehicle sensors 132. The vehicle sensors 132 may include a motion sensor, an accelerometer, a gyroscope, an engine sensor, a microphone, a battery sensor, an alternator sensor, a wheel sensor, a camera, or any combination thereof. The vehicle operation data 130 may include information extracted from an onboard vehicle processor, such as motor activity, speed of the vehicle, and/or activation of vehicle driving systems, that are characteristic of vehicle operation. Such information may further be correlated to location information 110 to confirm or further define the driving conditions of the vehicle 128 and used in conjunction with environmental context information 114 to assess the likelihood of an unsafe driving event.

The computing device 118 may determine a degree of likelihood that an unsafe driving condition is occurring. For example, the computing device 118 may determine via the vehicle operation data 130 detected by the vehicle sensors 132 (e.g., noise detected by the noise detection sensors) a likelihood of an occurrence of abuse, a crime, a fire, a flood, icy conditions, construction, pot holes, traffic conditions, or a combination thereof. Details of the computing devices 118, the vehicle 128, and/or the user device 104 may be further understood with reference to FIG. 2.

Figure 2:
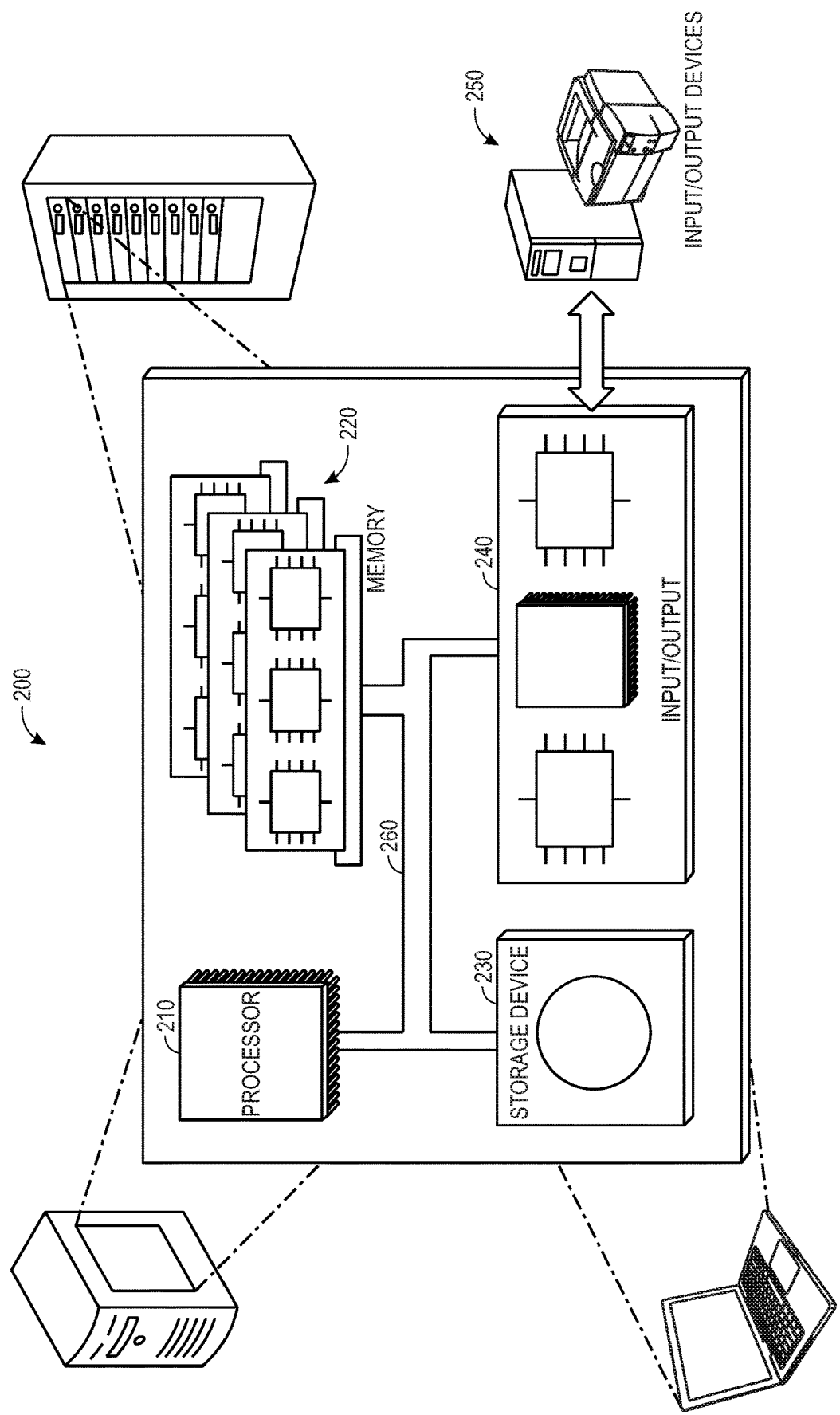
FIG. 2 depicts an example computing system, according to implementations of the present disclosure.

FIG. 2 depicts an example computing system, according to implementations of the present disclosure. The system 200 may be used for any of the operations described with respect to the various implementations discussed herein. For example, the system 200 may be included, at least in part, in one or more of the user devices 104, the server device(s) 116, the computing device 118, the vehicle 128, and/or other device(s) described herein. The system 200 may include one or more processors 210, a memory 220, one or more storage devices 230, and one or more input/output (I/O) devices 250 controllable through one or more I/O interfaces 240. The various components 210, 220, 230, 240, or 250 may be interconnected through at least one system bus 260, which may enable the transfer of data between the various modules and components of the system 200.

The processor(s) 210 may be configured to process instructions for execution within the system 200. The processor(s) 210 may include single-threaded processor(s), multi-threaded processor(s), or both. The processor(s) 210 may be configured to process instructions stored in the memory 220 or on the storage device(s) 230. The processor(s) 210 may include hardware-based processor(s) each including one or more cores. The processor(s) 210 may include general purpose processor(s), special purpose processor(s), or both.

The memory 220 may store information within the system 200. In some implementations, the memory 220 includes one or more computer-readable media. The memory 220 may include any number of volatile memory units, any number of non-volatile memory units, or both volatile and non-volatile memory units. The memory 220 may include read-only memory, random access memory, or both. In some examples, the memory 220 may be employed as active or physical memory by one or more executing software modules.

The storage device(s) 230 may be configured to provide (e.g., persistent) mass storage for the system 200. In some implementations, the storage device(s) 230 may include one or more computer-readable media. For example, the storage device(s) 230 may include a floppy disk device, a hard disk device, an optical disk device, or a tape device. The storage device(s) 230 may include read-only memory, random access memory, or both. The storage device(s) 230 may include one or more of an internal hard drive, an external hard drive, or a removable drive.

One or both of the memory 220 or the storage device(s) 230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 200. In some implementations, the CRSM may include a data store that provides storage of computer-readable instructions or other information in a non-transitory format. The CRSM may be incorporated into the system 200 or may be external with respect to the system 200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 210 and the memory 220 may be supplemented by, or incorporated into, one or more application-specific integrated circuits (ASICs).

The system 200 may include one or more I/O devices 250. The I/O device(s) 250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 250 may also include one or more output devices such as a display, LED(s), an audio output device (e.g., a speaker), a printer, a haptic output device, and so forth. The I/O device(s) 250 may be physically incorporated in one or more computing devices of the system 200, or may be external with respect to one or more computing devices of the system 200.

The system 200 may include one or more I/O interfaces 240 to enable components or modules of the system 200 to control, interface with, or otherwise communicate with the I/O device(s) 250. The I/O interface(s) 240 may enable information to be transferred in or out of the system 200, or between components of the system 200, through serial communication, parallel communication, or other types of communication. For example, the I/O interface(s) 240 may comply with a version of the RS-232 standard for serial ports, or with a version of the IEEE 1284 standard for parallel ports. As another example, the I/O interface(s) 240 may be configured to provide a connection over Universal Serial Bus (USB) or Ethernet. In some examples, the I/O interface(s) 240 may be configured to provide a serial connection that is compliant with a version of the IEEE 1394 standard.

The I/O interface(s) 240 may also include one or more network interfaces that enable communications between computing devices in the system 200, or between the system 200 and other network-connected computing systems. The network interface(s) may include one or more network interface controllers (NICs) or other types of transceiver devices configured to send and receive communications over one or more networks using any network protocol.

Computing devices of the system 200 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Figure 3:
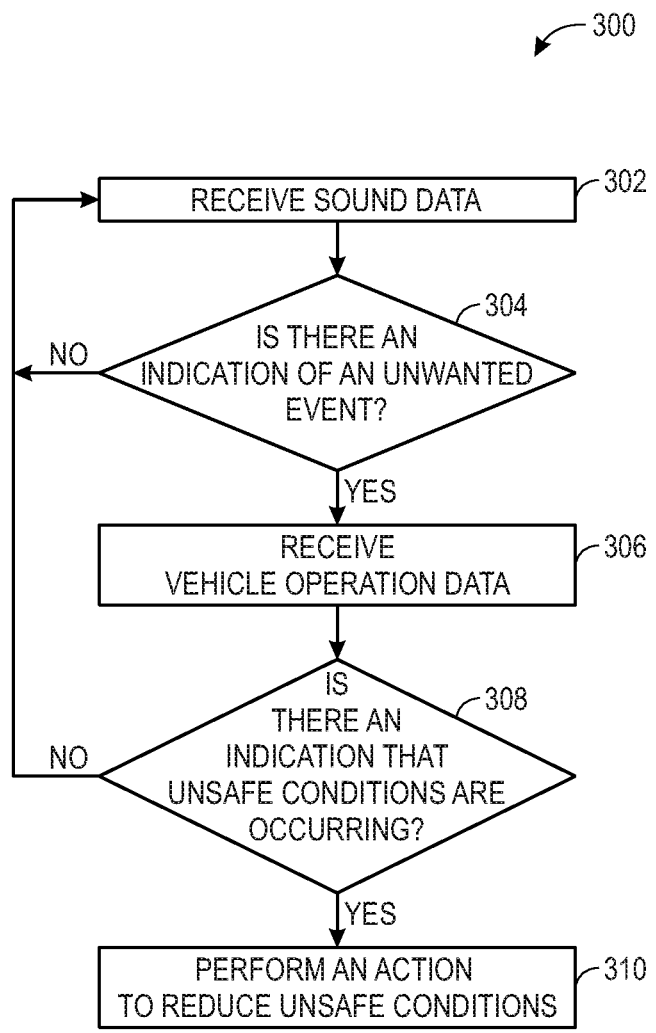
FIG. 3 depicts a flow diagram of an example process for monitoring of sound data and vehicle data to identify unwanted events and/or unsafe driving conditions, according to implementations of the present disclosure.

FIG. 3 depicts a flow diagram of an example process 300 for monitoring of sound data and vehicle data to identify unwanted events, according to implementations of the present disclosure. At block 302, the computing device 118 may receive information indicative of a sound in or near the vehicle 128. As described above, the sound information can be received via the device 104 (e.g., the device sensors 112) or via the vehicle 128 (e.g., the vehicle sensors 132) disposed internal or external to the vehicle 128.

At block 304, the computing device 118 determines whether there is an indication of an unwanted driving event. Examples of unwanted driving events may include, but are not limited to, a likelihood of an occurrence of abuse, a crime, a fire, a flood, icy conditions, construction, pot holes, traffic conditions, or a combination thereof. In one embodiment, identifying whether an unwanted event is occurring/has occurred is determined in part by detecting a change in sound data extracted from the noise detection sensors (e.g., sensors 112 or 132 that are internal or external the user device 104 and/or the vehicle 128). The computing device 118 may assess sound data and extract human voices from the sound data to perform an assessment of driver and/or passenger mood. For example, the computing device 118 may determine that a change in intensity of the voice of a passenger or the driver may indicate a verbal altercation between passengers may be occurring or that a driver is yelling at another driver outside of the vehicle 128 in an event of road rage. In another example, the computing device 118 may use vehicle operation data related to a vehicle audio system to determine if the change in detected voices has to do with music being played within the car. That is, the music or stereo input signal acquired from the vehicle operation data may be subtracted from noise data to acquire the environmental noises data in the car interior attributable to the occupants. Further, the device 118 may also access baseline voice identification information for the driver or frequent passengers in the vehicle 128 as part of distinguishing between voices played over the vehicle stereo system (e.g., a news report, an audio drama) and a change in tenor or mood of the driver. That is, the extracted voice data from the sensors 112, 132 may be compared to stored voice information of the driver. The voice data may be assessed for patterns indicative of various mood changes that may be associated with impaired driving (anger, panic, etc.). The patterns may also include interaction patterns, such that interactions between an adult and a child or two or more adults are assessed for abuse patterns. The device 118 may also store user preferences for different vehicle drivers to identify anomalous usage. In another example, the device 118 may, upon detection of exterior unsafe conditions (weather events, sirens, brake squeals), automatically adjust the music volume downwards to permit the driver to assess the noise conditions. Such an embodiment may prevent drivers from being unaware of approaching emergency vehicles when a stereo volume is too high.

In another example, the computing device 118 may determine that a siren is approaching the vehicle 128 (based on a detected increase in high frequency sound over a short period of time and that emanates from outside the vehicle), which could indicate that a fire truck, police car, ambulance, or other vehicle requiring emergency access to the roadway is approaching. In another example, the computing device 118 may determine that the vehicle is driving through water based on a characteristic sound of tires in water detected by one or more vehicle sensors 132. Further, the water level of the water may be estimated based on differences in the characteristic sound for different water depths. When high water on a roadway (e.g., estimated to be above a certain depth threshold) is detected by an individual vehicle 128, the location may be automatically tagged and provided to one or more traffic applications, social media sites, or reporting services to alert other drivers.

At block 306, the computing device receives the vehicle operation data 130. As discussed above, the vehicle operation data 130 may include data extracted from the vehicle sensors 132. The vehicle sensors 132 may include, but are not limited to, a motion sensor, an accelerometer, a gyroscope, an engine sensor, a battery sensor, an alternator sensor, a wheel sensor, a camera, or any combination thereof.

At block 308, the computing device 118 determines whether there is an indication of unsafe driving conditions. In one example, the computing device 118 may determine that a driver is erratically driving through input received via the wheel sensor or other vehicle operation data 130 where the driver may have jerked the steering wheel rapidly or repeatedly in various directions, which may in turn cause a characteristic tire squealing sound that is detected. Accordingly, data indicative of rapid steering and a tire squealing sound may form a pattern that is indicative of an unsafe driving event. In another example, the computing device 118 may determine based on characteristic rapid pounding sounds emanating from a vehicle exterior that the driver is in an unsafe driving predicament (e.g., in a hail storm or hurricane). In another embodiment, the computing device 118 may determine via the camera and/or sound data that the driver is in a verbal or physical altercation with another passenger or another driver or via phone.

At block 310, the computing device 118 may perform an action to reduce occurrence of unwanted events and/or unsafe conditions. For example, the computing device 118 may output a notice or alert via a notification system of the vehicle 128 or the device 104. In some embodiments, the notification system may output the notice or alert via messaging via social media, text message, chat programs, phone calls, and the like. The notification system may alert the driver, the passenger, family members, authorities, or any other individuals or groups of individuals that the user has selected to receive such notifications. In one embodiment, the computing device 118 may generate notifications in real-time to a traffic service, a weather service, a fire department, a police department, or other website, application or public safety department. Further, if the computing device 118 receives information related to unsafe conditions or detects unsafe conditions, the computing device 118 may initiate messages or warnings to the driver via a user interface. In one example, the warnings may include recommendations to stop or to take an alternate route. The device 118 may also identify if the vehicle 128 has deviated from a recommended course of action as part of a driver quality metric. The notification system may also be used as an input to a self-driving vehicle. That is, the control system of a self-driving vehicle may be in communication with the device 118 and may respond dynamically to messages and updates.

In another example, the computing device 118 may, based on the vehicle operation data 130 and/or the environmental context data 114, determine that the unwanted event is a maintenance event or a repair event. For example, the vehicle sensors 132 may detect a characteristic sound while driving associated with unbalanced tires. The characteristic sound may be identified based on a comparison to driving sounds associated with balanced tires, e.g., a calibration sound from the manufacturer or a recorded sound from the vehicle acquired directly after a balancing maintenance event. Based on the detected sound data, a maintenance indication may be provided to the user (e.g., via the user device 104). Other noise-based maintenance events or repair events may include detection of air-conditioning malfunction based on anomalous venting noises or detection of alternator issues based on characteristic noises.

Figure 4:
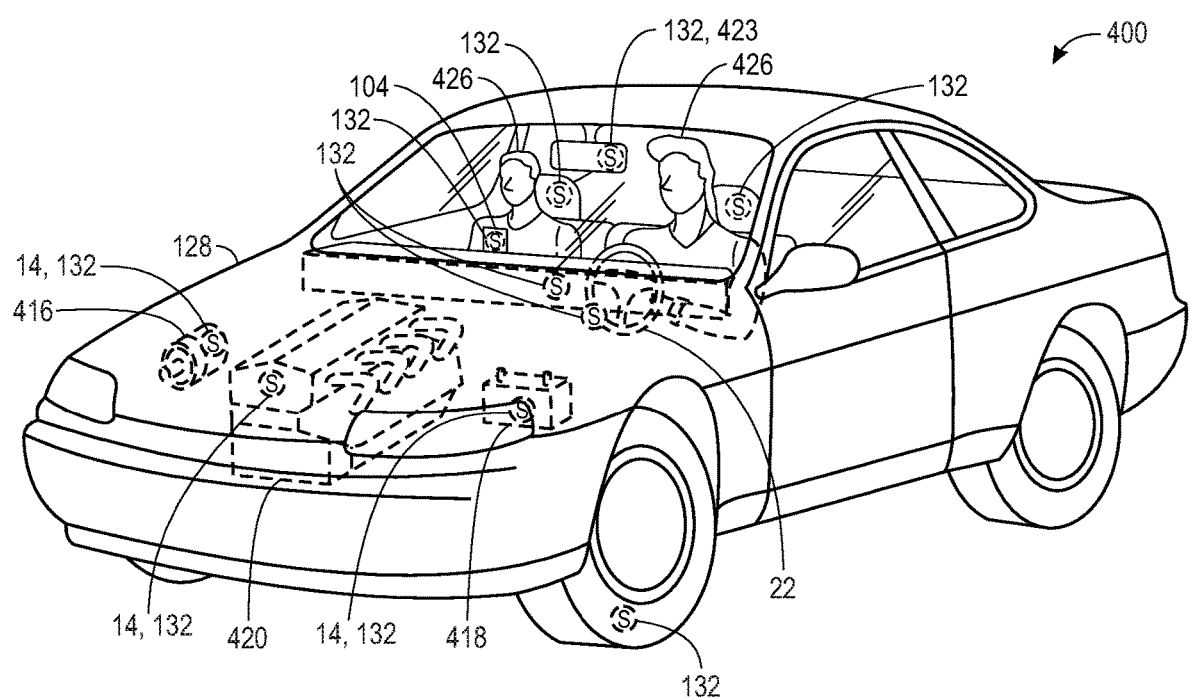
FIG. 4 is a perspective view of a vehicle used in the driving condition identification system used in a vehicle, according to an embodiment of the present disclosure.

FIG. 4 is a perspective view 400 of the vehicle 128 used in the driving condition identification system, according to an embodiment of the present disclosure. While the vehicle 128 is illustrated as an automobile, it should be understood that the present disclosure applies to any suitable vehicle, such as a truck, motorcycle, commercial vehicle, self-driving vehicle, recreational vehicle, all-terrain vehicle, boat, airplane, snowmobile, and the like. The vehicle 128 may include one or more vehicle sensors 132 that assess characteristics of the vehicle 128 and whether the vehicle 128 is in operation. As discussed herein, the vehicle sensors 132 may include one or more noise detection sensors (e.g., microphones) that collect environmental sound data from which unsafe driving events may be determined. In addition, the vehicle sensors 132 may include an engine sensor that monitors whether an engine 416 of the vehicle 128 is running. The vehicle sensors 132 might include a battery sensor that detects whether a battery 418 of the vehicle 12 is operable or if the battery 418 may soon need to be replaced or recharged to ensure adequate operation of the vehicle 128 to promote safer driving conditions. In some embodiments, the vehicle operation sensors 14 may include an alternator sensor that determines whether an alternator 420 of the vehicle 128 is attempting to start the vehicle 12, which can then be used in conjunction with the environmental context data 114 and/or the location information 110 to determine if the vehicle is being started in an unsafe time (e.g., during a hurricane). The vehicle operation sensors 14 may include a wheel sensor that detects a speed at which a wheel 22 of the vehicle 128 is rotating. The wheel sensor may also detect the presence of precipitation (e.g., rain, snow, ice) and help detect external conditions that can contribute to unsafe driving conditions. While in certain embodiments the computing device 118 may communicate directly with the sensors 132, it should also be understood that the information from the sensors 132 may be stored in a memory of the vehicle 128 and/or passed through a control device or the user device 104.

In further embodiments, other sensors (such as front or rear facing cameras 423) of the vehicle 128 may be used to determine that the vehicle 128 is in operation. Additionally or alternatively, sensors external to the vehicle 128 may be used to determine that the vehicle 128 is in operation. For example, the vehicle sensors 132 may include location sensors, orientation sensors, and/or motion sensors of a mobile electronic device 104 that determine that, based on the sensed location, orientation, and/or motion (e.g., calculated velocity and/or acceleration) of the mobile electronic device 104, a user 426 is in the vehicle 128 and the vehicle 128 is in operation. It should be understood that the vehicle sensors 132 listed above are merely examples, and that any suitable sensor that indicates that provides information about the vehicle operation is contemplated as a vehicle sensor 132.

Non-noise data from the vehicle sensors 132 (e.g., vehicle operation data 130) may be used in conjunction with detected noise data to identify unwanted events. The status of vehicle operation may be an input to an unwanted event, such that detected noise while a vehicle 128 is parked may be assessed differently than the same noise pattern detected while the vehicle 128 is in operation. That is, a detected noise pattern indicative of heavy rain but while the vehicle 128 is parked may be less of a concern than heavy rain while the vehicle 128 is in operation. However, certain noises that occur while the vehicle 128 is not in motion may nonetheless be of concern. In one example, detection of high water noises (e.g., sloshing noises, or noises indicative of an exterior sensor 132 being underwater) around an exterior of a vehicle 128 that is parked may trigger an alert to the vehicle owner of a danger of water infiltration into the vehicle.

The computing system 118 may include any suitable electronic device that may communicate information to the user 426 via, for example, a communication network, such as a smartphone, a wearable electronic device, a computing device, a laptop, a tablet, a vehicle operation tracking device (such as those used by insurance companies), and the like. The computing system 118 may be used to communicate with the user 426 when it is determined that the user 426 may be experiencing an unsafe driving condition or an unwanted event, such as by alerting the user 426, offering alternatives to operating the vehicle 128, incentivizing the user 426 to not operate the vehicle 128 (e.g., via offering discounts associated with auto insurance, products, services, etc.), penalizing the user 426 (e.g., via increasing payments associated with auto insurance, contacting a person familiar with the user 426, contacting a call center, and/or warning nearby drivers or autonomous vehicles). Additionally, the computing system 118 may incentivize the driver to take another route without flooding or dangerous road conditions. For example, the computing system 118 may record the driver's choice to take the safer route and offer a reward (e.g., discount or other driver reward). In another embodiment, the computing system 118 may record the driver's choice to take the unsafe route with flooding or dangerous road conditions to determine whether the driver's premiums should be reevaluated.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A system that detects and reduces unwanted events, comprising:
   a sensor configured to detect environmental noise data in a vehicle; and
   a device communicatively coupled to the sensor, wherein the device comprises a processor configured to:
      receive vehicle operation data comprising audio data from an audio system of the vehicle;
      identify noise data attributable to one or more occupants in the vehicle by subtracting the audio data from the audio system from the environmental noise data;

identify a characteristic associated with impaired driving based at least in part on the identified noise data;
determine that the vehicle is in operation based at least in part on the vehicle operation data;
in response to identifying the characteristic of the impaired driving and that the vehicle is in operation, presenting an incentive to a driver of the vehicle to reduce unsafe driving conditions;
determine that the driver of the vehicle has adjusted operation of the vehicle based in part on the incentive; and
send a first indication to an insurance provider of the driver to adjust a policy quote based in part on the adjusted operation of the vehicle.

2. The system of claim 1, wherein the sensor comprises a noise detection sensor, wherein the sensor is embedded in the vehicle or in the device.

3. The system of claim 1, wherein identifying the characteristic of the impaired driving comprises detecting a change in the noise data characteristic of an unsafe driving event.

4. The system of claim 1, wherein the sensor is external to the vehicle, in the vehicle, in the device, or a combination thereof.

5. The system of claim 1, wherein the device is a wearable or a mobile device.

6. The system of claim 1, comprising a vehicle operation sensor that generates at least some of the vehicle operation data, wherein the vehicle operation sensor comprises a motion sensor, an accelerometer, a gyroscope, an engine sensor, a battery sensor, an alternator sensor, a wheel sensor, a camera, or any combination thereof.

7. The system of claim 1, wherein the incentive comprises an alternative route or an offer of a discount for a particular product.

8. The system of claim 1, comprising simultaneously outputting a notice or an alert via a notification system of the vehicle while presenting the incentive to the driver of the vehicle, wherein outputting the notice comprises generating a message via social media, a text message, a chat program, or a real-time a notification to a traffic service, a weather service, a fire department, or a police department.

9. The system of claim 1, comprising:
determine that the driver of the vehicle has not adjusted operation of the vehicle based in part on the incentive; and
sending a second indication to the insurance provider of the driver to re-evaluate whether to increase a premium of insurance provided to the driver.

* * * * *